United States Patent [19]
Dunn et al.

[11] Patent Number: 5,877,835
[45] Date of Patent: Mar. 2, 1999

[54] METHOD OF MANUFACTURING A LIQUID CRYSTAL DISPLAY

[75] Inventors: Patrick M. Dunn, Coral Springs; Thomas J Swirbel, Davie; Diana Works, Ft. Lauderdale, all of Fla.

[73] Assignee: Motorola, Inc., Schaumburg, Ill.

[21] Appl. No.: 806,004

[22] Filed: Feb. 24, 1997

[51] Int. Cl.$^6$ .................................................. C09K 19/02
[52] U.S. Cl. ........................ 349/182; 349/185; 349/186
[58] Field of Search ................................. 349/185, 186, 349/182

[56] References Cited

U.S. PATENT DOCUMENTS

| | | | |
|---|---|---|---|
| 3,909,930 | 10/1975 | Gurtler | 29/592 |
| 3,952,405 | 4/1976 | Vest | 29/592 |
| 5,446,569 | 8/1995 | Iwai et al. | 359/78 |
| 5,452,113 | 9/1995 | Ikeno | 359/53 |
| 5,576,866 | 11/1996 | Yamada et al. | 359/81 |
| 5,624,974 | 4/1997 | Onishi et al. | 349/182 |

*Primary Examiner*—William L. Sikes
*Assistant Examiner*—Joanne Kim
*Attorney, Agent, or Firm*—Dale W. Dorinski

[57] ABSTRACT

The driving voltage of a liquid crystal display can be adjusted by irradiating the liquid crystal fluid in the display with ultraviolet light. After the fluid is placed in the display, it is exposed to a predetermined dose of high intensity ultraviolet light. The ultraviolet light alters the chemical composition of the fluid, thus changing the switching voltage of the fluid and the driving voltage of the display.

13 Claims, 4 Drawing Sheets

METHOD OF MANUFACTURING A LIQUID CRYSTAL DISPLAY

TECHNICAL FIELD

This invention relates in general to liquid crystal displays, and more particularly to a method of manufacturing a liquid crystal display with a customized driving voltage.

BACKGROUND

Liquid crystal displays (LCDs) employ a fluid disposed between two substrates. Each of the substrates has a transparent electrode on them. The fluid, i.e., the liquid crystal medium, is made up of various materials, such as cholesterol, cyano-biphenyl groups and so on. The chemical makeup and composition of the liquid crystal fluid is the critical element that determines the level of the applied voltage that is required to be applied to the electrodes in order to effect a change in the arrangement of the liquid crystal molecules. The applied voltage at which the liquid crystal fluid first starts to change from one state to another is known as the "off" or "threshold" voltage, and the voltage at which the change becomes complete is known as the "on" or "saturation" voltage. The various vendors of liquid crystal fluids take great care in order to precisely formulate the composition of each fluid to meet specific threshold and saturation voltages for various LCD applications. For example, an LCD used in a watch that is powered by a tiny single cell battery may have a very low driving voltage whereas an LCD used in a fixed appliance such as a refrigerator or a video cassette recorder having a much larger capacity power supply would operate at a higher driving voltage. In order to create LCDs that need this wide range of properties, the LCD manufacturers must not only stock a wide range of liquid crystal fluid compositions but each of these compositions must be carefully monitored and controlled in order to prevent any contamination that may inadvertently modify the driving voltage.

Traditionally, this problem of creating a variety of driving voltages has been solved by carefully blending various types of liquid crystal fluids together in precise formulations. Although the modern practice of chemistry is such that these formulations can be carefully controlled, this entire formulation process still contains a significant degree of art. Clearly, an improved method of providing liquid crystal LCDs with varying driving voltages would be an addition to the industry.

DETAILED DESCRIPTION OF THE PREFERRED EMBODIMENT

The driving voltage of a liquid crystal display (LCD) can be adjusted by irradiating the liquid crystal fluid in the LCD with ultraviolet (UV) light. After the fluid is placed in the LCD, it is exposed to a predetermined dosage of high-intensity UV light. This high-intensity light alters the chemical structure of the liquid crystal fluid, thereby changing the switching voltage of the fluid. By correlating the intensity or amount of UV light to the change in switching voltage, an LCD can be provided that has any single driving voltage selected from a continuous range of voltages.

Figure 1:
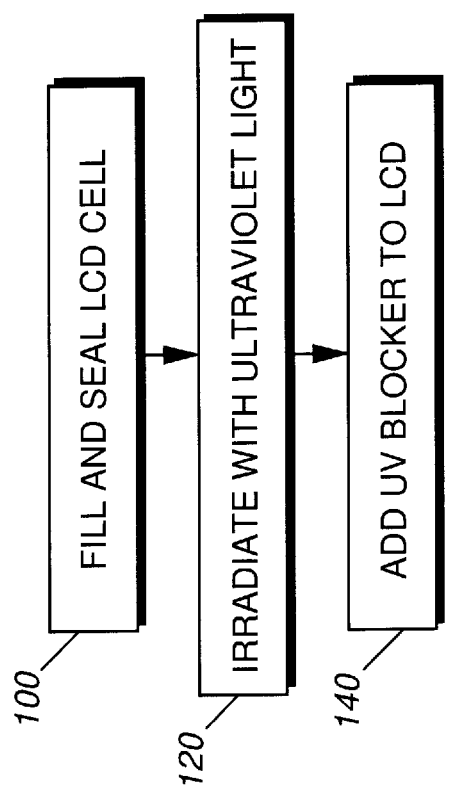
FIG. 1 is a process flow diagram showing a preferred embodiment of the present invention.

While the specification concludes with claims defining the features of the invention that are regarded as novel, it is believed that the invention will be better understood from a consideration of the following description in conjunction with the drawing figures. The invention can best be explained by providing an example of an LCD made in accordance with the invention. It is assumed that the reader is knowledgeable and skilled in the art of liquid crystal displays and, thus, many elements of the LCD cells that are well known in the art will not be further elaborated upon here. The LCD in was fabricated in accordance with the flow chart shown in FIG. 1. The LCD had two transparent substrates with indium-tin oxide (ITO) metallization electrodes on the two interior surfaces of the glass substrates. The LCD was filled with a liquid crystal fluid obtained from Hoffman-LaRoche, Part No. TN-7679. This is a nematic-type fluid, containing a cholesteric dopant. Other types of fluids including pure nematic fluids can also be substituted, along with cholesteric fluids (such as Merck ZL-1-811) containing other constituents. The cell was then end-sealed (step 100) and the driving voltage of the completed cell was measured. The "off" voltage was approximately 1.5 volts and the "on" voltage was approximately 2.2 volts. The LCD cell was then irradiated with UV light having a primary wavelength at approximately 365 nanometers (step 120). In practice, UV light is typically considered to have wavelengths between about 350 nanometers. and 450 nanometers. Although UV light used in this example had a primary wavelength of 365 nanometers., there are also sidebands at 405 nanometers and 430 nanometers. After measuring the driving voltage, this cell was subjected to a series of additional UV radiation dosages at precisely controlled levels. The amount (i.e. 'dosage') of UV radiation was measured with a detector placed on the exterior surface of the LCD. After each batch of UV radiation dosages, "on" and "off" driving voltage of the LCD was measured.

After the LCD is irradiated to obtain the predetermined driving voltage level, additional steps are performed to complete the assembly of the LCD (step 140). Items such as a polarizer are added to the LCD. Typically, the LCD is irradiated prior to attachment of the polarizer to the front of the LCD because the polarizer would significantly reduce the amount of UV radiation reaching the liquid crystal fluid. In practice the polarizer acts to block out most or all of the UV light reaching the liquid crystal fluid (LC). Thus, since the completely assembled LCD always has a polarizer on the front, the polarizer will act as a blocker to prevent incidental UV light from reaching the liquid crystal fluid during the service life of the LCD. Incidental UV radiation typically comes from sunlight or artificial light that may impinge upon the LCD while it is in the electronic device. However, the use of a UV blocker, such as the polarizer or an additional layer of material provided on the surface of the glass substrate to prevent UV transmission, will aid in stabilizing the long-term driving voltage of the LCD.

Figure 2:
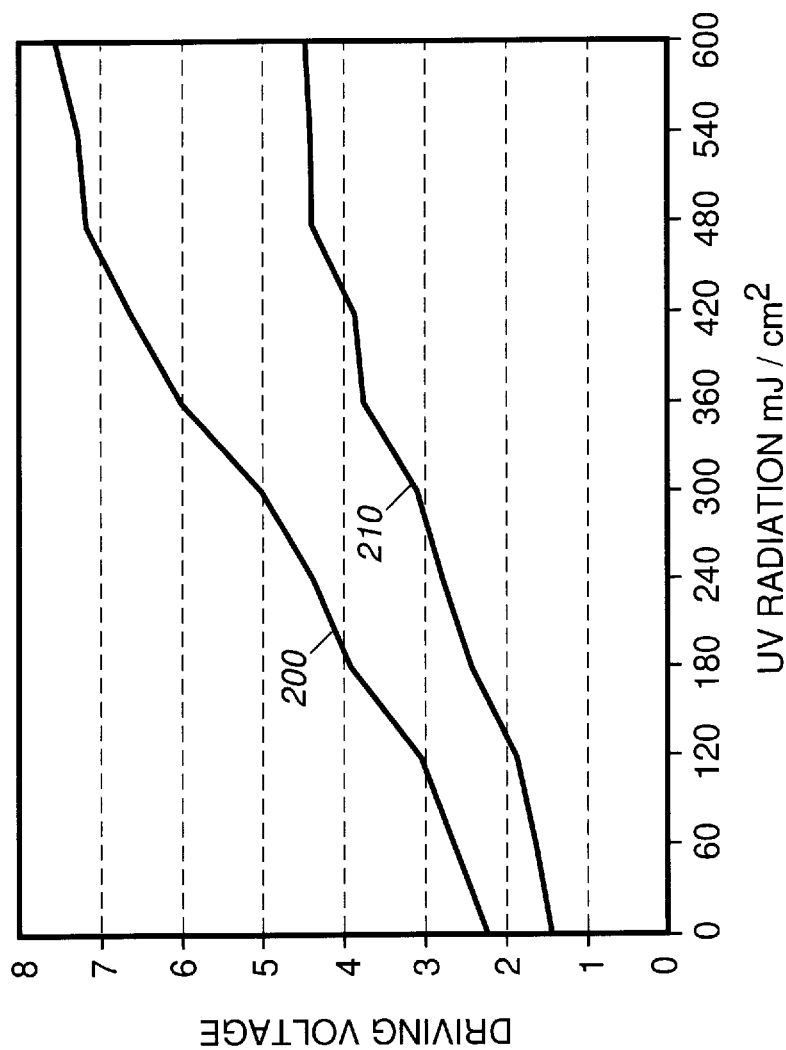
FIG. 2 is a graph of driving voltage for an LCD cell versus ultraviolet irradiation in accordance with the present invention.

FIG. 2 shows a graph of driving voltage versus ultraviolet radiation in mJ/cm$^2$. As can be seen, increasing the amount of UV radiation that the liquid crystal fluid is exposed to increases the driving voltage. It is also significant to note that the delta between the "on" 200 and "off " 210 driving voltages also increases as the amount of radiation increases. It can be thus appreciated that a designer can create an LCD with a specific "on" and "off" stage driving voltage selected from among a continuous range of voltages using just a single fluid and irradiating the fluid with a predetermined amount of UV radiation. This linear relationship between driving voltage and UV radiation is a very predictable way to control the driving voltage of the assembled LCD.

Figure 3:
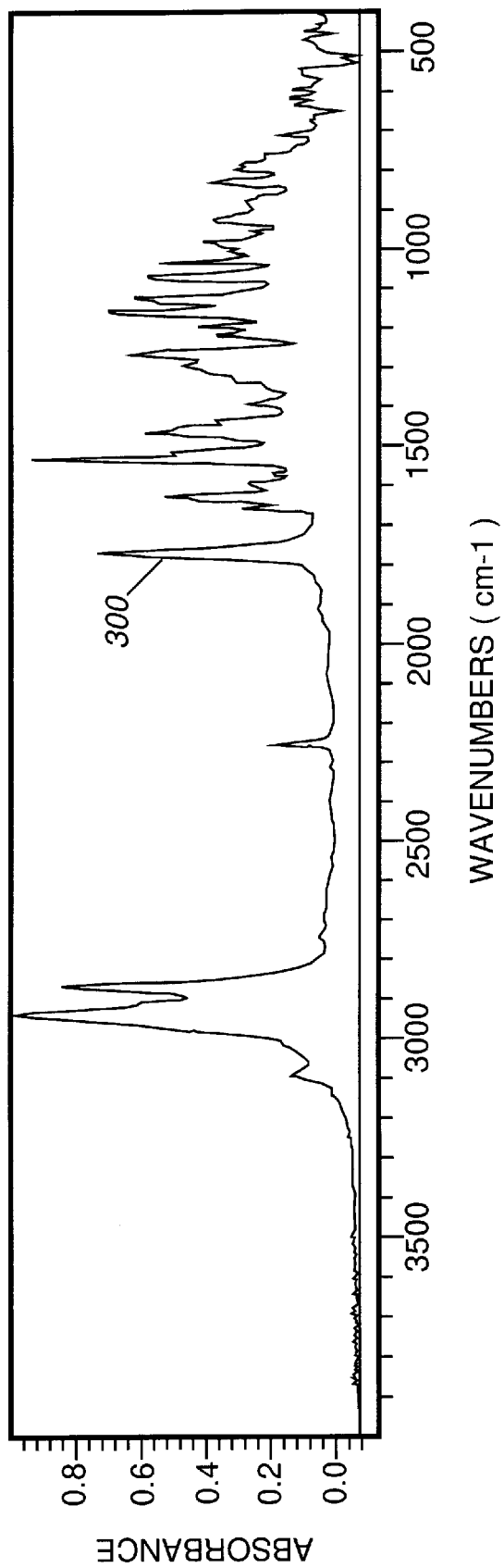
FIG. 3 an FTIR spectrogram of a liquid crystal fluid prior to exposure to ultraviolet light.
Figure 4:
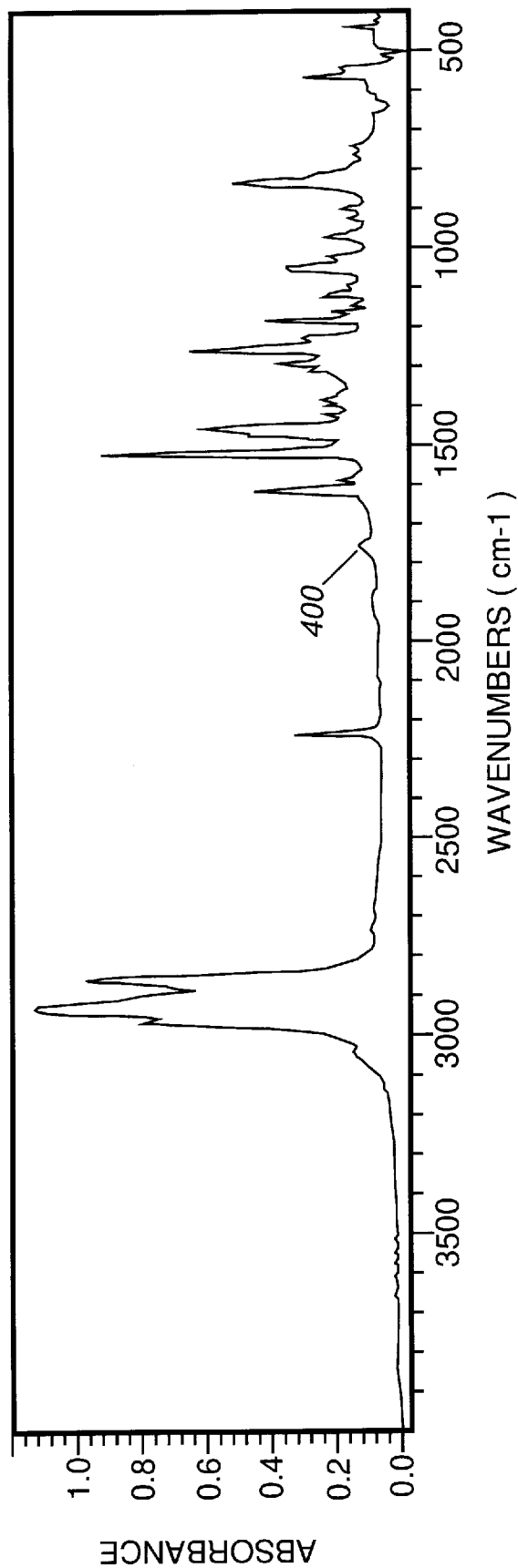
FIG. 4 is an FTIR spectrogram of the liquid crystal fluid shown in FIG. 3 after irradiation with ultraviolet light.

FIG. 3 shows an infrared spectrogram of the liquid crystal (LC) fluid as received from the manufacturer. Those skilled in the art will notice that a significant peak 300 appears between 1700 and 1800 wavenumbers. FIG. 4 is an infrared spectrogram of the same material after being irradiated with 480 mJ/sq·cm of UV light. Comparing the peak 400 that lies between 1700 and 1800 wavenumbers to that identical peak shown in FIG. 3, one can see that the intensity has been significantly reduced, indicating a reduction in the amount of this chemical structure. Typically, this peak represents a functional group in the liquid crystal material, such as a carbonyl group. This group contains a carbon atom and an oxygen atom linked together by a double bond. This C=O linkage is reduced during the ultraviolet radiation process, thereby altering the electrical behavior of the liquid crystal fluid. Careful inspection and comparison of FIGS. 3 and 4 will also reveal other subtle changes in the region between 900–1400 wavenumbers. A loss of C=O linkages will also affect the shape of some of these other bands and peaks. In addition, other chemical changes are occurring that will not be further discussed here. We postulate that this reduction in the amount of C=O linkages in the chemical structure of the liquid crystal fluid is responsible for the increase in the driving voltage of the completed cell. As the chemical change of the fluid occurs, the switching voltage of the fluid is modified. Thus, a fluid with different switching voltages will create an LCD having different driving voltages.

In an alternate embodiment of the invention, the liquid crystal fluid is irradiated prior to injection into the LCD cell. Although the radiation of the LC fluid can be performed in a number of ways, one useful method is to create a thin film of the fluid and then irradiate that thin film with UV light. Flood exposure of a thin film of material insures that all the material is uniformly exposed to the same level of UV energy. Careful consideration must be given to the thickness of the film and uniformity of the UV exposure across the surface area of the film. In this way, a larger volume of LC fluid can be created with the predetermined switching voltage prior to insertion of the fluid in the LC cell. In summary, it can be seen that an LCD cell can be manufactured that has a customizable driving voltage. This method of manufacture eliminates the need to stock a wide variety of LC fluids and thus, allows the LCD manufacturer a significant amount of flexibility in producing a wide variety of LCDs with varying driving voltages.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of manufacturing a liquid crystal display (LCD), comprising:

providing an LCD having a driving voltage and having a nematic liquid crystal fluid disposed therein; and altering the driving voltage by irradiating the LCD with ultraviolet light at an intensity sufficient to alter the chemical structure of the nematic liquid crystal fluid.

2. The method as described in claim 1, wherein the step of altering comprises increasing the driving voltage.

3. The method as described in claim 1, wherein the liquid crystal fluid contains a cholesteric dopant.

4. A method of manufacturing a liquid crystal display (LCD), comprising:

providing an LCD having a driving voltage and having a liquid crvstal fluid disposed therein: and altering the driving voltage by irradiating the LCD with ultraviolet light at an intensity sufficient to reduce the amount of C=O linkages in the liquid crystal fluid.

5. A method of manufacturing a liquid crustal display (LCD), comprising:

providing an LCD having a driving voltage and having a liquid crystal fluid disposed therein; and irradiating the LCD with a predetermined quantity of ultraviolet light at an intensity sufficient to alter the chemical structure of the liquid crystal fluid, to increase the driving voltage to a predetermined level.

6. The method as described in claim 2, further comprising a final step of adding an ultraviolet blocker to the LCD to shield the liquid crystal fluid from further exposure to ultraviolet light.

7. The method as described in claim 6, wherein the ultraviolet blocker comprises a polarizer.

8. The method as described in claim 2, wherein the step of irradiating comprises irradiating with ultraviolet light at a wavelength of 365 nanometers.

9. A method of manufacturing a liquid crystal display (LCD), comprising:

providing an LCD having a driving voltage and having a liquid crystal fluid disposed therein, said liquid crystal fluid having a chemical structure that contains C=O linkages; and irradiating the LCD with a predetermined amount of ultraviolet light; and said ultraviolet light altering the chemical structure of the liquid crystal fluid such that the driving voltage of the LCD is increased.

10. The method as described in claim 9, wherein the amount of C=O linkages in the liquid crystal fluid is reduced during the step of irradiating.

11. A method of manufacturing a liquid crystal display (LCD) cell that has a driving voltage selected from a continuous range of driving voltages, comprising:

providing a liquid crystal fluid having a switching voltage that is a function of the liquid crystal fluid chemical structure;

irradiating the liquid crystal fluid with ultraviolet light at an intensity sufficient to modify the chemical structure, so as to change the switching voltage; and filling the LCD cell with the irradiated liquid crystal fluid.

12. The method as described in claim 11, wherein the switching voltage is increased in the step of irradiating.

13. The method as described in claim 11, wherein the LCD cell has an ultraviolet blocking layer thereon to prevent additional modification of the liquid crystal fluid chemical structure.

* * * * *